F. R. INNES.
MECHANISM FOR INTEGRATING POWER CURRENT VALUES.
APPLICATION FILED DEC. 21, 1916.
1,256,234.
Patented Feb. 12, 1918.
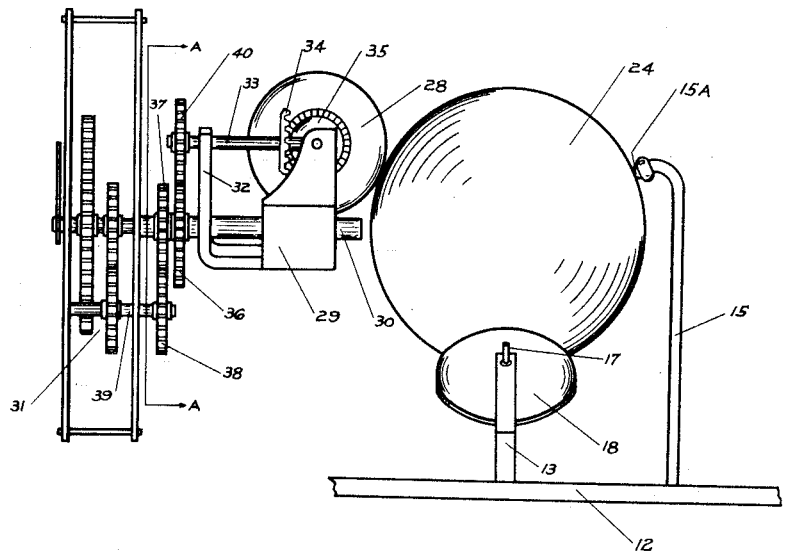
FIG.-I
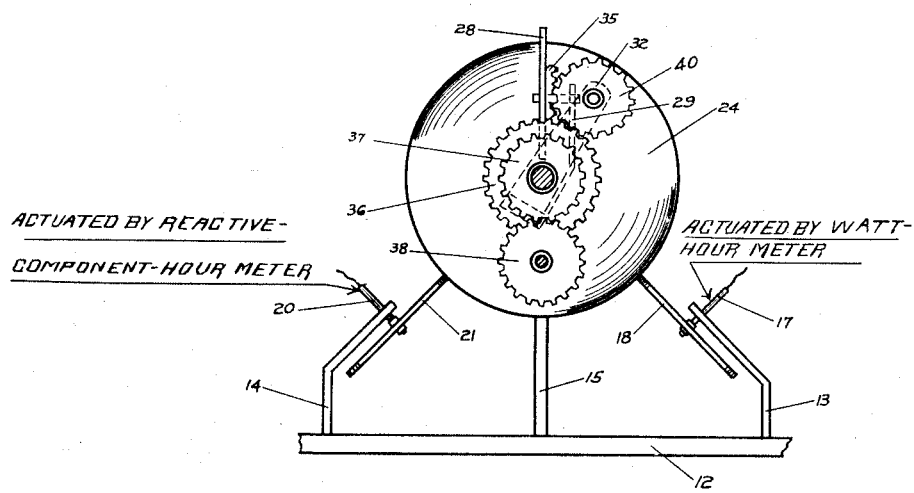
FIG.-II
WITNESSES:
ERNEST A. TUTTLE.
INVENTOR
Frank R. Innes
BY
William M. Ewan
ATTORNEY

UNITED STATES PATENT OFFICE.

FRANK R. INNES, OF DETROIT, MICHIGAN.

MECHANISM FOR INTEGRATING POWER-CURRENT VALUES.

1,256,234.  Specification of Letters Patent.  Patented Feb. 12, 1918.

Application filed December 21, 1916. Serial No. 138,214.

*To all whom it may concern:*

Be it known that I, FRANK R. INNES, a citizen of the United States, residing at Detroit, county of Wayne, State of Michigan, have invented a certain new and useful Improvement in Mechanism for Integrating Power-Current Values, and declare the following to be a full, clear, and exact description of the same, such as will enable others skilled in the art to which it pertains to make and use the same, reference being had to the accompanying drawings, which form a part of this specification.

This invention relates to mechanism for integrating current values, and has for its object an improved construction, whereby volt ampere hour units may be registered directly and accurately, without the necessity of taking cognizance of the angular separation of pressure and current.

The present methods of charging for electrical energy are based either upon a consideration of energy or watt hour consumption alone, or upon the foregoing modified by an additional consideration, that of power factor. To those familiar with the art, it is apparent that the second method is the fairer, both to consumer and producer, but it is at present an empiric, or at best approximate, method, requiring much extra computation. My device provides means for accurately using this method; it not only indicates volt ampere hours, but is also an absolute phase angle indicator whose capacity is a full 360 degrees.

In the drawings:

Figure I is a side elevation partly in section along the line A—A of Fig. II.

Fig. II is a front elevation of my improved apparatus.

12 represents a base, from which rise supporting brackets 13, 14, and 15. In the tops of brackets 13 and 14 are rotatably journaled the shafts 17 and 20 of the disk or wheel members 18 and 21. The disk 18 is connected mechanically to rotating member of watt or cosine volt ampere hour meter (not shown), so that the extent of its rotation is dependent on the cosine volt amperage passing through the meter. Similarly the disk or wheel 21 depends, for its actuation, upon its connection, with the reactive factor or sine volt ampere hour meter (not shown). The shafts 17 and 20 are perpendicular to one another, and the supporting brackets 13 and 14 are so spaced relatively to the diametrical size of the disk or wheels, 18 and 21, and to the size of the spherical member 24, that the disks peripherally engage its surface at points thereon 90 degrees separate from one another, that is, at the ends of radii which extend to the peripheral contacts of the wheels; but to hold the sphere from falling, I provide one or two other bearing points against its surface, in the form, for example, of the upper end of the overreaching bracket 15, which engages the upper portion of the sphere's surface; its engaging end may, if desired, be provided with an anti-friction roller 15$^a$. For the remaining bearing point on the upper portion of the sphere, to keep it from falling to the floor, as well as to take registry of the net total and the components of the sphere's movements, under the frictional actuation of the disks 18 and 21, I provide a collecting wheel 28, which is rotatably journaled in the forked end of the bracket 29, which is fixed to rotate about the stationary shaft 30, which is supported from the framework of a suitable registering mechanism 31 (shown only diagrammatically). Rising from an intermediate point on the stationary shaft 30 and rotatable thereabout is a bearing bracket 32, in whose outer end is journaled one end of a shaft 33, the other end of which is journaled in the bracket 29. A gear wheel 34 on this shaft 33 meshes with a corresponding gear wheel 35 which is carried on one face of the collecting wheel 28, so that its rotative movement, due to its frictional contact with the sphere 24, is thereby transmitted to the shaft 33; on the rear end of the shaft 33 is a second gear wheel 40, which lies in the same plane with and intermeshes with one set of teeth on the periphery of the compound gear wheel 36—37, which is rotatably journaled on the stationary shaft 30. The peripheral teeth on the other half 37 of the compound wheel 36 mesh with the teeth on the registering gear wheel 38, which, supported on the shaft 39, transmits these rotative actuations to the suitably calibrated registering mechanism 31 within the casing shown. Thus in addition to the rotative movement communicated to the registering mechanism 31 through the various gears, due to the rotation of the collecting wheel 28 the compound gear wheel 36 is also rotated to a degree proportionate to the extent of the circular movement of the bracket 29 and its supported parts, about the axis of the stationary shaft 30 as a center, due to the compound and diverse rotational movements of the sphere 24.

The operation of this apparatus is as follows:

The two disks 18 and 20, being rotatively actuated from their individual sources, tend to transmit this peripheral movement to the frictionally engaged surface of the sphere 24 which they support, as heretofore explained. The wheels are actuated in the same direction, the left hand one 21 (Fig. I) by a reactive factor or sine volt ampere hour meter, the right hand one 18, by a watt or cosine volt ampere hour meter. Their speeds are to each other as the sine to the cosine of the same angle, or as the cosine of one angle is to the cosine of its complementary angle. Since the two wheels engage the surface of the sphere at points 90° apart, the radii of the cross sections of the sphere at the points of contact are to each other as the cosines of complementary angles, or as the sine or cosine of the same angle, it follows that the sphere will revolve at a rate proportionate to the volt amperes, which is the equal factor in the rates of speed of the two wheels, and the radii of the cross sections of the sphere at the points of contact will be to each other as the sine and cosine of the same angle as that which determines the relative speeds of the two wheels. The position of the axis of the sphere, or an index proceeding from it which the collecting wheel 28 and its connected parts constitute, will then show the phase angle, and the integrated revolutions of the sphere will measure the volt ampere hours. The rotation of the sphere, the net resultant of its movements due to this actuation, from the two right-angularly variant sources, is thus communicated to the registering mechanism, which discloses the net power value of the current received by the customer, directly in terms of bolt ampere hours; the computations heretofore necessary to arrive at this are thus avoided.

What I claim is:

1. An integrating mechanism of the character described, having in combination with a pair of rotatable transmitting members provided with means for imparting the respective totals of their movements to a related member, a rotatably supported sphere adapted to frictionally be engaged by said transmitting members at diverse points thereon, one of said members being operatively connected with a cosine volt ampere hour meter and the other with a sine volt ampere hour meter, and a registering member adapted to be actuated by the sphere.

2. An integrating mechanism of the character described, having in combination a pair of rotatable members respectively deriving their actuation from the current passing through a cosine volt ampere hour meter and a sine volt ampere hour meter, a freely rotatable sphere supported by the engagement of said rotatable members against angularly diverse peripheral points thereon and adapted to be plurally actuated thereby, and a terminal member of a registering mechanism in engagement with said sphere whereby the vector sum of the movements imparted to the sphere by said rotatable members is rendered directly readable on the registering mechanism.

3. In a differential mechanism for integrating current values, in combination with a pair of rotatable driving members whose axes are perpendicular to one another, a rotatable transmitting member with which each of said rotatable members is in operative engagement, and means for transmitting the resultant movement of said last named member due to its connection with said rotatable members to a registering mechanism.

4. In a differential mechanism for integrating current values, the combination of a pair of wheel members adapted to be driven by a cosine voltampere hour meter and by a sine voltampere hour meter respectively, a rotatable transmitting member with peripherally diverse points on whose surface said wheel members are in frictional engagement, and means in operative engagement with said transmitting member for registering its rotative movement.

5. An integrating mechanism, having in combination a rotatable sphere, a pair of wheel members in frictional peripheral engagement therewith at points whose radii are substantially perpendicular to one another, one of said wheel members being adapted to be operated by a cosine voltampere hour meter and the other wheel member being adapted to be operated by a sine volt ampere hour meter, and means for registering the rotative movement of said sphere, said means thereby registering an amount proportional to the vector sum of the individual movement of said wheel members.

In testimony whereof, I sign this specification in the presence of two witnesses.

FRANK R. INNES.

Witnesses:
  WILLIAM M. SWAN,
  JEFFERSON G. THURBER.